United States Patent [19]

Marikovsky et al.

[11] Patent Number: 4,652,378
[45] Date of Patent: Mar. 24, 1987

[54] METHOD OF AND APPARATUS FOR REDUCTION OF TURBIDITY IN A BODY OF FLUID

[75] Inventors: Moshe Marikovsky, Rehovot; Benjamin Doron, Jerusalem, both of Israel

[73] Assignee: Solmat Systems, Ltd., Yavne, Israel

[21] Appl. No.: 640,885

[22] Filed: Aug. 15, 1984

[51] Int. Cl.$^4$ ................................................. C02F 1/52
[52] U.S. Cl. ........................... 210/716; 60/641.8; 126/415; 210/727; 210/747; 210/170; 210/198.1
[58] Field of Search ............... 60/641.8; 126/415; 210/702, 712, 716, 723–728, 747, 170, 198.1, 199, 206, 241

[56] References Cited

U.S. PATENT DOCUMENTS

| | | | |
|---|---|---|---|
| 3,087,890 | 4/1963 | Pye | 210/725 |
| 3,575,854 | 4/1971 | Richards | 210/724 |
| 3,578,586 | 5/1971 | Gal et al. | 210/725 |
| 4,055,491 | 10/1977 | Porath-Furedi | 210/521 |
| 4,176,058 | 11/1979 | Grobler | 210/747 |
| 4,226,711 | 10/1980 | Cain et al. | 210/723 |
| 4,336,999 | 6/1982 | Assaf | 366/262 |
| 4,475,535 | 10/1985 | Assaf | 60/641.8 |
| 4,479,486 | 10/1984 | Manning et al. | 210/747 |
| 4,507,206 | 3/1985 | Hughes | 210/727 |

FOREIGN PATENT DOCUMENTS

| | | | |
|---|---|---|---|
| 51-82952 | 7/1976 | Japan | 210/726 |
| 52-13671 | 4/1977 | Japan | 210/726 |
| 54-19470 | 2/1979 | Japan | 210/726 |

*Primary Examiner*—Peter Hruskoci
*Attorney, Agent, or Firm*—Sandler & Greenblum

[57] ABSTRACT

The turbidity of a fluid is reduced by adding a treatment solution containing a flocculation agent to said fluid. The treatment solution has a density different from that of the fluid. It is added at selected locations in the fluid such that the difference in densities will cause the treatment solution to be uniformly distributed throughout the fluid to be treated thereby causing flocs to be uniformly distributed throughout the fluid. In this way, a fluid can be treated in situ, rather than transported to a separate location, and mechanically mixed with a flocculation agent. This technique has particular application in the preparation and maintenance of solar ponds.

30 Claims, No Drawings

METHOD OF AND APPARATUS FOR REDUCTION OF TURBIDITY IN A BODY OF FLUID

TECHNICAL FIELD

This invention relates to a method of and apparatus for reducing turbidity in a body of fluid, and more particularly for reducing turbidity in large standing bodies of water in which no substantial fluid flow occurs.

BACKGROUND ART

Sharp rises in the cost of conventional fuels have made alternative sources of power, such as solar ponds, economically attractive. A solar pond is a body of standing water having a non-convective layer, called a halocline, located just below the surface of the water. The halocline, which is usually about 1–1.5 m deep, has a downwardly directed density gradient achieved by a salinity that changes from about 5% near the top of the halocline to around 30% near the bottom. Covering the halocline is a wind-mixed layer from 10–50 cm deep, depending on weather conditions, this layer having a uniform salinity of around 5%. Below the halocline is water of uniform salinity, about 30%, which forms the heat storage layer of the pond.

Solar radiation incident on the surface of the pond penetrates into the halocline and into the heat storage layer, and is absorbed, thereby heating the water. In the wind-mixed layer, heated water below the surface is lighter than the cooler surface water; and the differences in densities throughout the wind-mixed layer establish convection currents that rapidly transfer the warmer water in the wind-mixed layer to the surface, where the absorbed heat is dissipated to the atmosphere. The temperature of the wind-mixed layer thus approximates ambient temperature.

Water in the halocline heated by the absorption of solar radiation also becomes lighter; but the density profile of the halocline, which closely matches the salinity profile, ensures that the density of a lower heated stratum exceeds the density of the stratum immediately thereabove, with the result that convection currents in the halocline are suppressed. Consequently, after a period of time a temperature profile is established in the halocline which, in general, matches the salinity profile. Ultimately, the water in the heat storage layer is heated; and the heated water in this layer is protected against conductive heat loss to the atmosphere by the halocline, which thus acts as an insulator. In this manner, the temperature of the water in the heat storage layer can reach 90–100° C.

Optimal performance of a solar pond requires deep penetration of solar radiation into the pond. If the water is turbid, less radiation penetrates into the heat storage layer, reducing the efficiency of the pond. Therefore, the clarity of water in a solar pond is of critical importance.

For large-scale solar ponds, i.e., those capable of producing electricity in the megawatt range, the bodies of water are so large that clarifying and maintaining the clarity of the water is a formidable problem. For example, a solar pond located at the latitude of southern California must have an area of about 1 km$^2$ (10$^6$ m$^2$) in order to have the capability of supplying sufficient heat to generate about 3 MW of electricity on a continuous basis (i.e., 24 hours per day). Solar ponds of this size, whether converted from an existing body of water or created artificially, contain so much water that conventional techniques of water treatment to reduce turbidity are expensive and time-consuming.

Construction of a solar pond requires pre-clarification of the water that is to constitute the heat storage layer, i.e., clarification before the halocline is created above the heat storage layer. After the main body is clarified, the water with which the halocline is to be created must also be clarified.

The conventional approach to reducing turbidity in large standing bodies of water involves the construction of settling ponds, into which water from the main body is pumped and treated with flocculating material such as aluminum sulfate. To be effective, the flocculating material must be dispersed throughout the water being treated; and the usual procedure is to provide a mechanical mixing system.

Conventionally, a three-stage process is involved in treating the water with a flocculation agent: a rapid mixing stage in which the agent is mixed into the water to achieve uniform distribution; a slow mixing stage to distribute the turbidity-causing material with water to be trapped in the flocs; and a sedimentation stage in which the flocs settle to the bottom, thus clearing the water.

After the sediment has settled, the clarified water can then be returned to the main body of water. This pumping, mixing, and settling is cumbersome and, for large bodies of water, involves considerable time. After the main body of water is clarified, construction of the halocline can then take place; and only after the halocline is in place can the pond act as a solar collector. Conventional approaches to reducing the turbidity of large bodies of water therefore increase construction time and costs of a solar pond.

It is, therefore, an object of the present invention to provide a new and improved method of and apparatus for reducing the turbidity of a standing body of fluid wherein the problems encountered with prior art techniques are overcome or substantially reduced.

BRIEF DESCRIPTION OF THE INVENTION

The reduction in turbidity of a large standing body of brine which is to form the heat storage layer of a solar pond can be accomplished in accordance with the present invention by preparing a solution of a flocculant, such as aluminum sulfate, where the density of the solution is different from the density of the brine, and injecting a predetermined amount of the solution into the body at a level that depends on the relationship between the density of the solution and the density of the brine. When the solution is less dense than the brine, injection occurs near the bottom of the body of brine. Such injection of less dense solution into a more dense brine sets up a three-layer flow regime in the body of water in a manner described in U.S. Pat. No. 4,336,999, whereby the flocculant in the solution becomes uniformly distributed throughout the body of brine without the necessity for mechanically mixing the water. Flocs produced by the reaction of the flocculant with the water are also uniformly distributed. Being heavier than the brine, the flocs settle to the bottom of the body of water clearing it of turbidity-causing material.

The total amount of flocculant added to the body of water is preferably selected such that all of it reacts with the water in the shortest period of time, and none remains in suspension. Thus, the quantity of flocculant is determined in accordance with known procedures which include trial and error experiments with various amounts of flocculant in a fixed volume of a sample of water to be treated. For example, it has been found that successful treatment of Dead Sea end brine generally requires the addition of 200 ppm. of aluminum sulfate. Treatments of less dense brines of the Dead Sea require less flocculant. In an experiment carried out under laboratory conditions, Dead Sea water at a temperature of 80° C. was clarified within 12 to 24 hours using commercial grade aluminum sulfate at a concentration of 10 to 50 ppm. Treatment with other flocculants will likely require different amounts of the flocculant which, as indicated previously, are found by trial and error. Likewise, treatment of other types of brine will likely require the addition of a different amount of flocculant depending on concentration and temperature. Finally, the procedure described above is also applicable to the clarification of water of any density including fresh water. In each case, however, the amount of flocculant used is determined from experience or trail-and-error as described above.

The preferred way to add the flocculant to the water is to first prepare, what is termed herein, a stock solution of the flocculant which can then be diluted to produce a treatment solution (flocculant material) having the desired density relative to the density of the water to be treated. An example of a stock solution usable for treating Dead Sea water is a 5% aluminum sulfate solution in tap water. This solution can be stored indefinitely.

When the density of the treatment solution is greater than that of the water to be clarified, the solution may be added above the bottom of the body of water, preferably near the top. Again, the difference in density causes the treatment solution to mix with the fluid until the material is uniformly distributed throughout the fluid. The result here is the same as described above in that flocs will be uniformly distributed throughout the fluid and come into contact with the turbidity-causing materials without requiring external pumping or mixing.

When the fluid to be treated is water in a body that is being converted, maintained, or constructed to operate as a solar pond, the treatment solution is made less dense than the water, and is added near the bottom of the body of water through apertured pipes, for example. If the treatment solution is more dense, it is added to the surface of the water, for example, by spraying from aircraft or watercraft. In such a case, a surface-tension reducing agent may be added before, during, or after the treatment with the treatment solution so that the solution will intermix readily at the surface.

The present invention thus makes possible the treatment of large bodies of water in situ, without mixing or pumping or removing the water to a treatment center. This process is useful both in the creation of a solar pond as a halocline is established, as well as in the maintenance of an existing solar pond should turbidity recur.

DETAILED DESCRIPTION

In constructing a solar pond using an existing body of very salty water (e.g., water with a concentration of 30% or more, such as Dead Sea end brine) where the brine is to constitute the heat storage layer of the pond, clarification of the water is required as the halocline is constructed. In maintaining an existing solar pond, where relatively fresher water must be added periodically to replace water lost by evaporation, clarification of the make-up water is essential to prevent fouling of the pond. According to the present invention, turbidity reduction in an existing standing body of relatively dense water which is to form the heat storage layer of a solar pond is accomplished using a flocculant-containing treatment solution whose density is less than the density of the water to be treated, and adding the treatment solution to the body of water below the surface thereof. Preferably, a predetermined amount of solution is added near the bottom of the body of the water. Being lighter than the water, the treatment solution establishes a three layer flow regime in the water in a manner described in U.S. Pat. No. 4,336,999, the disclosure of which is hereby incorporated by reference. As a result, the treatment solution becomes uniformly distributed throughout the body of water without any external mechanical mixing.

The preferred technique for adding the treatment solution to the water to be treated is to pressurize the solution and convey it to an apertured pipe positioned on the bottom of the body of water. Preferably, the apertures have a diameter of approximately 6.0 mm; and the treatment solution is pumped through the pipe under such pressure that the treatment solution exists at approximately 0.5–1 meter/second.

The exit velocity of the treatment solution is important because if it is too slow or too fast, optimal local mixing of the solution with the water body will not be achieved. However, the velocity can vary widely. The above-mentioned aperture diameter and exit velocity achieve optimal mixing, although it is obvious that the relationship between these variables can be changed and still achieve a good mixing effect.

The apertured pipe may be inserted into the water near the shoreline. The length of apertured pipe used is a function of the time available to complete treatment of the body of water. Thus, the volume of water to be treated determines the volume of treatment solution, and the number of apertures and the optimum flow rate therethrough determine piping required. As described in the U.S. Pat. No. 4,336,999, injection of the solution at one location in the body of water is adequate to achieve uniform distribution of the treatment solution throughout the body of water.

The treatment solution is prepared after selecting a suitable flocculant. Aluminum sulfate is preferred, although other flocculants are known to the art. The aluminum sulfate may be mixed with tap water to form a 5% stock solution which can be stored indefinitely. When the flocculation process is to be carried out, the stock solution is mixed with a carrier liquid, such as brine, to form a treatment solution with a suitable density. In constructing a pond using brine from a terminal lake such as the Dead Sea, the carrier liquid can be brine from the terminal lake, diluted to reduce its density by the 5% aluminum sulfate stock solution. When Dead Sea water is to be used for addition to the stock solution, it is mixed with the 5% solution in a ratio of 3 parts Dead Sea water to 1 part solution.

Treatment of Dead Sea water generally requires 200 ppm. of flocculant material to Dead Sea water, although water of different quality will require a different ratio. For example, Dead Sea brine diluted to have a density relative to that of water of 1.10, requires a 100 ppm. treatment.

The mixing of the 5% stock solution with the other liquid to form the treatment solution is presently considered to be important. The treatment solution should be produced one-half to one hour before transport to the work site, where the treatment solution should be remixed vigorously approximately every five minutes until used. Use should take place preferably between approximately one-half to one-and-one-quarter hours after the beginning of the treatment.

The original mixing of the stock solution produces treatment solution of a desired density for use. The remixing of the treatment solution has as its main purposes maintaining a homogenized flocculant material, and the quick generation of carbon dioxide gas bubbles before the material is added to the water to be treated.

Carbon dioxide is formed accoridng to the reaction: $Al_2(SO_4)_3 + 3Ca(HCO_3)_2 \rightarrow 2Al(OH)_3' + 3CaSO_4 + 6CO_2'$ when the aluminum sulfate reacts with the bicarbonate in the water. Were it not for the mixing of the stock solution, and remixing of the treatment solution, much of this gas would be generated in situ. If this happens, carbon dioxide bubbles will be attracted to flocs as the bubbles rise. This increases the buoyancy of the flocs which float to the surface rather than sinking. If this occurs, not only must the water surface be skimmed to cleanse it, but the efficacy of the flocs will be reduced. In the method of the present invention, however, all or most of the carbon dioxide that can be generated is freed from the treatment solution before the latter is added to the water body.

The mixing and injection of the homogenized treatment solution speeds up the formation of flocs in the water body to be treated, resulting in a savings of approximately 6-10 hours over conventional methods, which usually have a three-stage mixing process: a rapid mixing stage, a slow mixing stage, and a sedimentation stage.

As mentioned above, there may be situations in which the density of the water body to be treated is so low that no suitable flocculant material, as described above, can be prepared so as to have a lower density than that of the water body.

In such a case, a suitable flocculant, such as aluminum sulfate, or the like, can be used in particulate form, rather than in solution. Particulate flocculant is spread out over the surface of the pond by hand, or by boat or plane, for convenience when treating larger bodies of water. Because the flocculant particles have a density greater than that of the water, they will sink. The size of the particles and the rate of sedimentation should be such that the particles will have dissolved completely just as the particles reach the bottom of the water body, or the bottom layer of water down to which cleaning action is to take place, so as not to waste material. The dissolution of the flocculant will cause turbulence, and therefore mixing. Winds will also help the mixing process.

Because water has surface tension, and because there may be a thin film of oil or other substance on the surface of the water which would inhibit the sinking of the flocculant, it may be necessary to add a surface-tension reducing agent known to the art to combat this.

The surface-tension reducing agent can be added before the flocculant, or after it. It can also be added with the flocculant, for example, by coating the particles of the flocculant.

In addition to the situation where the density of the water requires the use of a particulate flocculant, particulate flocculant can also be used on very large bodies of water, even where the first method, as described above, might be applicable, as long as the density of the particulate flocculant is greater than that of the water to be treated.

When the method of the present invention is practiced, most of the microbes and algae present in the body of water being treated will be removed in situ as flocs form and settle out; and the phosphate level (the primary cause for blooms) will be reduced. This has the beneficial effect of reducing the likelihood that blooms of algae will grow in the pond. Such blooms cause turbidity that reduce the efficiency of a solar pond. Thus, the present invention results in a saving of time and money over conventional method of biological control.

In another aspect of the present invention, the method of the present invention may be applied to treatment of the heat storage layer. Gradient corrections to the halocline in solar ponds may become necessary three to five times per year using the mixer of the U.S. Pat. No. 4,336,999. When a dense solution is needed in the gradient correction process, its source is often water from the heat storage layer. However, the heat storage layer may be rather turbid and, thus, if used for gradient correction, will result in an increase in the turbidity of the halocline.

If the water of the heat storage layer were first removed from the pond for conventional turbidity treatment, the removed water will rapidly cool, and the heat contained in the water will thus lost. In order to prevent this waste, the heat storage layer water can be treated in in situ. Accordingly, an area equal to about 0.001 percent of the area of the whole pond is walled up to the height of the storage layer. In this segregated zone, the turbid water can then be treated as described above.

The materials causing the turbidity are cleared by the introduction of treatment solution at the bottom of the segregated zone. Mixing within the segregated zone is achieved by reason of the difference in density between the brine in the segregated region and the treatment solution. Holes in the upper part of the walls of the treatment zone allow for the exchange of water between the segregated zone and the remainder of the storage layer. Pumping treated water from the zone draws in turbid water into the zone, and the treated water can be used for gradient correction.

As a result of this procedure, water in the segregated zone will be clear and ready for use to correct the gradient within 12 to 24 hours following the application of treatment solution to the segregated zone. To save area and construction costs, it may be desirable to provide a pit in the bottom of the heat storage zone so that the treatment zone will be capable of holding more heat storage water. Flocculation is much more rapid and efficient as the temperature of the body to be treated increases. Therefore, less time, expense and effort are required to treat water in situ in the heat storage layer, rather than treating it outside of the pond, where it will cool rapidly before treatment.

Alternatively, turbidity may be reduced during and at the same time as the building up of the various layers of the pond. In this embodiment, the solar pond is filled to about one-half of its final height with brine of a density of that which is to be used in the heat storage layer. At this time, fresh water or lighter density brine is injected into the pond at a level chosen to be the top of the heat storage layer. This newly injected water dilutes the dense brine from the level of injection to the water surface. This diluted layer will constitute the first layer of the gradient zone, or halocline. As the last stage of this dilution is being carried out, flocculating agents are added in situ at this level, thus producing a treated layer.

Following the above-described procedure, fresh water or still lighter density brine is injected into the pond at a point above the previous injection point. This will result in a further dilution of the water in the uppermost level of the pond. As the desity at this new height reaches a level suitable for the second layer of the gradient zone, flocculating agents are once more added in situ at this level to produce another treated layer.

The above-described process is repeated, at higher and higher levels until a totally treated gradient zone with the desired number of layers is created.

In one laboratory treatment example, aluminum sulfate was used as a flocculating agent. The flocculant concentration ranged from 200 ppm at the most dense layer of the halocline to 100 ppm at the upper layer. After 48 hours, the absorbance was 0.000 optical density at the upper layer to 0.002 optical density at the most dense layer of the halocline.

In an experiment carried out under laboratory conditions, Dead Sea water at a temperature of 80° C. was purified within 12 to 24 hours, using commercial grade aluminum sulfate, at a concentration of 10 to 50 ppm.

Treatment of the water as it is added to the solar pond results in the saving of time, as well as eliminating the need for separate treatment areas and facilities for treating each storage layer and the various density layers of the halocline. This method can be used to treat both terrestrial solar ponds and floating solar ponds.

It is believed that the advantages and improved results furnished by the methods and apparatus of the present invention are apparent from the foregoing description of the preferred embodiments of the invention. Various changes and modifications may be made without departing from the spirit and scope of the invention, as described in the claims that follow.

What is claimed is:

1. A method for reducing turbidity in a standing liquid body of salt water that is to constitute a portion of a salt water solar pond comprising the steps of:
   (a) preparing a treatment solution containing a flocculant, such solution having a density different from the density of the standing body of water; and
   (b) adding treatment solution of the body of water such that the solution becomes uniformly distributed throughout the body of water without mechanically mixing thereof due solely to the influence of gravity on the treatment solution.

2. A method according to claim 1 wherein the density of the treatment solution is less than that of the liquid in the body.

3. A method according to claim 2 wherein the treatment solution is added below the surface of the liquid body.

4. A method according to claim 3 wherein the treatment solution is added near the bottom of the liquid body.

5. A method according to claim 4 wherein the treatment solution is added using a watercraft movable on the surface of the water.

6. A method according to claim 4 wherein the treatment solution is added through a submerged apertured pipe.

7. A method according to claim 6 wherein the apertures in the pipe have a diameter of approximately 6.0 mm.

8. A method according to claim 7 wherein the treatment solution is pressurized so that the velocity on exit from the pipe is on the order of approximately 0.5-1 meter/second.

9. A method according to claim 4 wherein the treatment solution comprises aluminum sulfate.

10. A method according to claim 9 wherein the treatment solution comprises an aqueous stock solution of aluminum sulfate, mixed with brine, of a salinity and in a proportion to the solution such that the resultant density of the liquid mixture is less than that of the liquid to be treated in the body and wherein said mixing with the brine occurs with 0.5-1.25 hours of mixing with said liquid body.

11. A method according to claim 10, wherein the aluminum sulfate stock solution is a 5% aqueous solution, and the brine is Dead Sea water in a ratio of 1 part solution to 3 parts Dead Sea water.

12. A method according to claim 11 wherein the treatment solution is intermittently remixed before use.

13. A method according to claim 2 wherein the treatment solution is added at a number of locations, sequentially.

14. A method according to claim 13 wherein the treatment solution is added at a number of horizontally displaced locations, simultaneously.

15. A method according to claim 1 wherein the density of the treatment solution is greater than that of the liquid body.

16. A method according to claim 15 whwerein the treatment solution is added near the surface of the liquid body.

17. A method according to claim 16 wherein the treatment solution is added at a number of discrete locations in the liquid body.

18. A method according to claim 15 wherein the treatment solution is added at a number of horizontally displaced locations, sequentially.

19. A method according to claim 15 wherein the treatment solution is added at a number of locations, simultaneously.

20. A method according to claim 15 wherein the treatment solution is added to the surface of the body in the presence of a surface tension reducing agent.

21. A method according to claim 20 wherein a surface tension reducing agent is added simultaneously with the treatment solution.

22. A method according to claim 20 wherein a surface tension reducing agent and the treatment solution are applied sequentially.

23. A method of correcting the gradient in a halocline of a solar pond having a heat storage layer below the halocline, said method comprising the steps of:
   (a) in situ treating the water in a zone of water in the heat storage layer below the halocline to reduce the turbidity of said zone by adding a flocculating agent to the water in said zone; and
   (b) using water from said zone to effect a gradient correction in the halocline.

24. The method as defined by claim 23, wherein the turbidity reduction in the heat storage layer is effected by treatment of the heat storage layer within a segregated zone located within the heat storage layer.

25. The method as defined by claim 24, wherein said zone is defined by a wall that extends substantially the top of the storage layer, and said zone comprises about 0.001 percent of the area of the whole pond.

26. The method as defined by claim 23, wherein the bottom of said zone extends below the bottom of the heat storage layer.

27. Apparatus for the in situ reduction of turbidity in a solar pond having a halocline overlying a heat storage layer, said apparatus comprising;
   (a) a walled-up area located within the heat storage layer for segregating a zone of the heat storage layer;
   (b) a supply of treatment solution containing a flocculating agent;
   (c) means for treating liquid in said zone with said treatment solution for reducing turbidity therein; and
   (d) at least one pump for moving treated liquid from said zone to a region of the pond above the heat storage layer.

28. The apparatus as defined by claim 27 wherein the bottom of the walled-in area extends below the level of the heat storage layer.

29. A process for reducing the turbidity of water in a solar pond having a halocline with different density levels overlying a heat storage layer, said process comprising treating each density level of water in the halocline separately with a flocculating agent, as each said density level of water is added to the pond.

30. A process for reducing the turbidity of a standing stratum of water of uniform density floating on a standing body of water of greater density, and having a lower interface with the body of water comprising the steps of:
   (a) broadcasting solid particles of flocculant on the surface of the stratum of water, said particles having a density greater than that of the standing body of water; and
   (b) the size of the particles and the rate of sedimentation being selected such that the particles dissolve substantially completely just as the particles sink to the level that defines said lower interface.

* * * * *